US005841993A

United States Patent [19]

Ho

[11] Patent Number: 5,841,993

[45] Date of Patent: Nov. 24, 1998

[54] SURROUND SOUND SYSTEM FOR PERSONAL COMPUTER FOR INTERFACING SURROUND SOUND WITH PERSONAL COMPUTER

[76] Inventor: Lawrence Ho, 11836 Clark St., Arcadia, Calif. 91006

[21] Appl. No.: 582,114

[22] Filed: Jan. 2, 1996

[51] Int. Cl.[6] .................................................. G11B 20/02

[52] U.S. Cl. .......................... 395/282; 395/884; 395/22; 381/20; 381/25; 381/61; 369/89

[58] Field of Search .................................. 395/282, 884, 395/800; 381/18, 182, 24, 27, 25, 22, 99, 61, 98, 20; 348/38, 552

[56] References Cited

U.S. PATENT DOCUMENTS

| | | | |
|---|---|---|---|
| 4,771,466 | 9/1988 | Modafferi | 381/99 |
| 4,953,213 | 8/1990 | Tasaki et al. | 381/24 |
| 5,172,415 | 12/1992 | Fosgate | 381/22 |
| 5,189,703 | 2/1993 | Holman | 381/61 |
| 5,386,473 | 1/1995 | Harrison | 381/24 |
| 5,388,181 | 2/1995 | Anderson et al. | 395/212 |
| 5,410,717 | 4/1995 | Floro | 395/800 |
| 5,459,790 | 10/1995 | Scofield et al. | 381/25 |
| 5,483,422 | 1/1996 | Bowen et al. | 361/802 |
| 5,497,206 | 3/1996 | Ji | 348/38 |
| 5,546,590 | 8/1996 | Pierce | 395/750 |
| 5,606,704 | 2/1997 | Pierce et al. | 395/750 |
| 5,675,390 | 10/1997 | Schindler et al. | 348/552 |

*Primary Examiner*—Meng-Ai T. An
*Assistant Examiner*—Eric S. Thlang
*Attorney, Agent, or Firm*—David & Raymond; Raymond Y. Chan

[57] ABSTRACT

A surround sound system for personal computer includes a control card and a PC surround decoder. The control card is a PC interface card for interfacing to the personal computer and draining the 5 VDC and ±12 VDC power from the personal computer as power source for both the control card and the PC surround decoder to operate. The PC surround decoder for processing the stereo source signal and generating left, center, right, surround and subwoofer signals. A connecting means electrically connects the PC surround decoder to the control card. The PC surround sound system is specified for incorporating with personal computer which enables the users to command the PC surround sound system with their computer keyboard or mouse and receive the full benefit of Dolby Surround encoded multimedia software and the like.

19 Claims, 15 Drawing Sheets

SURROUND SOUND SYSTEM FOR PERSONAL COMPUTER FOR INTERFACING SURROUND SOUND WITH PERSONAL COMPUTER

BACKGROUND OF THE PRESENT INVENTION

The present invention relates to surround sound decoder, and more particularly relates to a surround sound system specified for incorporating with personal computer.

Surround sound decoder was equipped with home audio system since 1982 for providing Movie Theater Sound. Conventional Stereo system simply decodes the sound input signal to left and right signals and output for stereo effect. However, the surround sound decoder enables the input surround sound signal to be decoded to generate four output sound signals, namely left signal, right signal, center signal, and surround sound signal, and output to normally five speakers including a center speaker located in the audio system, a left and a right speakers located at the left hand and right hand sides of the audio system, and a left surround sound speaker and a right surround sound speaker placed at the left back side and right back side of where the audience located.

Since the creation of the Personal Computer in the late 1970's, many manufacturers put into great effort in equipping the PC with sound system. Many companies have different products to address Stereo sound for the personal computer since the Stereo Sound Card was invented in the early 1990's. Recently, CD ROM becomes one of the essential equipment of a complete set of personal computer. The personal computer user is now able to enjoy stereo music and sound effect through his personal computer. It is a creative concept of the inventor of the present invention to accomplish surround sound with a personal computer, so that a personal computer may allow its user to command a specific PC surround sound decoder with their computer "mouse" and receive the full benefit of Dolby Surround encoded multimedia software and any other software that includes a stereo sound option. If a personal computer can be successfully equipped with a specific surround sound system so as to perform surround sound effect, it equals a huge step forward in making the personal computer even more "user-friendly" and one more step toward "multi-media".

However, although the surround sound decoder was utilized in home audio system in 1982, up to now, no surround sound decoder has been invented that succeeded in interfacing Surround Sound with a personal computer for bringing the benefits of Movie Theater Surround Sound to the personal computer. Those conventional surround sound decoders are specific designed for home audio/video system and are not compatible with the traditional configuration of personal computer. It is because the signal transmission in home audio/video system is different with the computer. The power source of personal computer is 5 VDC and ±12 VDC while the 5 VDC and ±12 VDC power source of the home audio system is 110 VAC or 220 VAC. The conventional home audio surround sound decoder is not designed for personal computer which has relatively smaller size and thus it is inadaptable with the housing frame of the personal computer. Moreover, since the personal computer system has a relatively high circuit and IC density and basically is a digital environment, it may cause induced noise which will influence the performance of the conventional surround sound decoder.

SUMMARY OF THE PRESENT INVENTION

The main object of the present invention is to provide a PC surround sound system specified for incorporating with personal computer which enables the users to command the PC surround sound system with their computer keyboard or mouse and receive the full benefit of Dolby Surround encoded multimedia software and the like.

Another object of the present invention is to provide a surround sound system for personal computer which is designed to adapt the PC power source of 5 VDC and ±12 VDC. It is embedded in the multimedia computer, draining the personal computer existing power of power source, so that it eliminates the power supply device of the unit. In socking the power from the motherboard of the personal computer, a voltage regulation circuitry is created to serve both voltage conversion and noise immunity purpose. To utilize the operation power of the personal computer, there are some logic circuit created to interface between the personal computer and the PC surround sound system, making a Dolby PC surround sound decoder of the present invention as part of the personal computer system and merging both in hardware and software ways.

Another object of the present invention is to provide a surround sound system for personal computer which can be installed within the housing frame of the personal computer system.

Another object of the present invention is to provide a surround sound system for personal computer which comprises a control card and a PC surround decoder wherein the control card is mounted on the back side of the personal computer system and the PC surround decoder is installed within a removable tray, 1 inch×4 inches×5.25 inches, which is mounted into an empty drive bay in the front panel of the personal computer system for installation. A built-in connecting means is utilized to connect the PC surround decoder to the control card. Utilizing such detachable installation of the portable PC surround decoder provided by the present invention enables the users to install the PC surround decoder fast and easily.

Another object of the present invention is to provide a surround sound system for personal computer having a feature of noise immunity.

Accordingly, the present invention provides a surround sound system for personal computer which comprises a control card and a PC surround decoder. The control card is a PC interface card for interfacing to the personal computer and draining the 5 VDC and ±12 VDC power from the personal computer as power source for both the control card and the PC surround decoder to operate. The PC surround decoder for processing the stereo source signal and generating left, center, right, surround and subwoofer signals. A connecting means for electrically connecting the PC surround decoder to the control card.

The control card has a 62 pin ISA bus connector plugged into a personal computer and compatible 62 pin ISA bus slot of the personal computer system, a function decoder and interface means and a power supply means. The function decoder and interface means comprises a programmable logic array for receiving the control signals and address signals from pins 11, 33, 44, 45 and pins 31, 22–27 respectively of the 62 pin ISA bus connector of the personal computer motherboard, a data buffer/driver which is an integrate circuit and two 3-state D-type latches receiving data signals from pins D0–D7 of the 62 pin ISA bus connector, and an address setting means which is a quad 2-input exclusive or gate IC for serving as the address decoder. The data buffer/driver and the two 3-state D-type latches function as data and control interface circuit between the personal computer and the surround sound system in which the programmable logic array also pre-programmed to serve as interface logic. Through the logic that pre-defined in the chip then distribute to the data buffer/driver and the 3-state D-type latches.

The power supply means comprises a predetermined number of IC regulator that regulate the +12 V and −12 V power source into +8 V and −8 V for linear circuitry on both the control card and the PC surround decoder.

The control card further comprises an interface card bracket and an input selector for selecting the input signals. The input signals can be either feed from internal source pin-type connector that sitting on the interface card or from external source of 3 mm stereo jacks on the bracket. The input selector has a predetermined number of CMOS analog switches function as gates to select the source signal. The signal then feed through a BBE high definition processor which has been designed to make music programs more intelligible and life-like than normally achieved with existing audio systems. The BBE processor works dynamically by boosting the harmonic content of the music programs, as determined by the signal input, and imparting a linear phase shift across the audio spectrum. The phase shift allows for a separation of the high, medium and low frequencies so that they do not arrive speaker network at precisely the same time so as to prevent the higher frequencies from being smothered. As the phase shift is minimal, 2 milliseconds, it is not perceived as a delay or echo. The interface card bracket comprises a plurality of output socket for connecting to the amplifiers of the left, right, center, subwoofer, and surround speakers respectively.

The PC surround decoder comprises a buffer and a Dolby Pro Logic decoder. The L/R audio signal sending from the BBE processor is fed through the buffer and then send into the Dolby Pro Logic decoder. The source L/R audio signal having Dolby surround information is encoded by means of a Dolby motion picture matrix of the Dolby Pro Logic decoder that combines four information channels into the film's two tracks. The Pro Logic decoder is a circuit that decodes surround information from two front channels and produces center and surround channels. The Pro Logic decoder circuit also includes a surround matrix comprising a delay line, a low-pass filter, a noise sequence generator, a modified B-type noise decoder, and a personal computer interface circuitry. There are also a software as device driver to be loaded into the personal computer. The Dolby Pro Logic decoder further comprises a built-in auto-balance buffer which offers 100 dB dynamic range. The Pro Logic decoder is an active process designed to enhance sound localization through the use of high-separation decoding techniques and is a direct descendant of the one used in Dolby stereo cinema processors, featuring a center channel output to complement the left, right and surround channels.

The PC surround decoder further comprises a digital which has a monolithic circuit, a predetermined number of switch, an amplifier, and a digital delay and filter. The monolithic circuit does Dolby B-type noise reduction processing on the surround channel signal feed from the delay stage. The switches are integrate circuits for path control on the Pro Logic mode and music mode. At music mode, the operational amplifier works with the digital delay and functions as Hall effect circuitry.

The PC surround decoder further comprises a volume and output means which has a volume control and a low pass filter. The volume control is an integrate circuit which is a 4-channel electronic potentio meter for controlling the signal levels of center, left, right, and rear channels. The volume control functions as volume master control and individual channel level adjustments. The low pass filter comprises two operational amplifiers which summarize the left and right channel signal and output with subwoofer channel signal.

The built-in connecting means which includes a 40 pin interface connector connected to the control card, a 40 pin decoder connector connected to the PC surround decoder, and a 40 pins flat cable connected from the control card to the 40 pin decoder connector of the PC surround decoder.

The control card is mounted on the rear panel of the personal computer system and the PC surround decoder is installed within a removable tray, 1 inch×4 inches×5.25 inches, which is mounted into an empty drive bay in the front panel of the personal computer system for installation. The front panel of the removable tray of the PC surround decoder has three indicators showing the status of power, BBE function and Dolby function respectively that are controlled on the computer screen.

DETAILED DESCRIPTION OF THE PREFERRED EMBODIMENT

Figure 13:
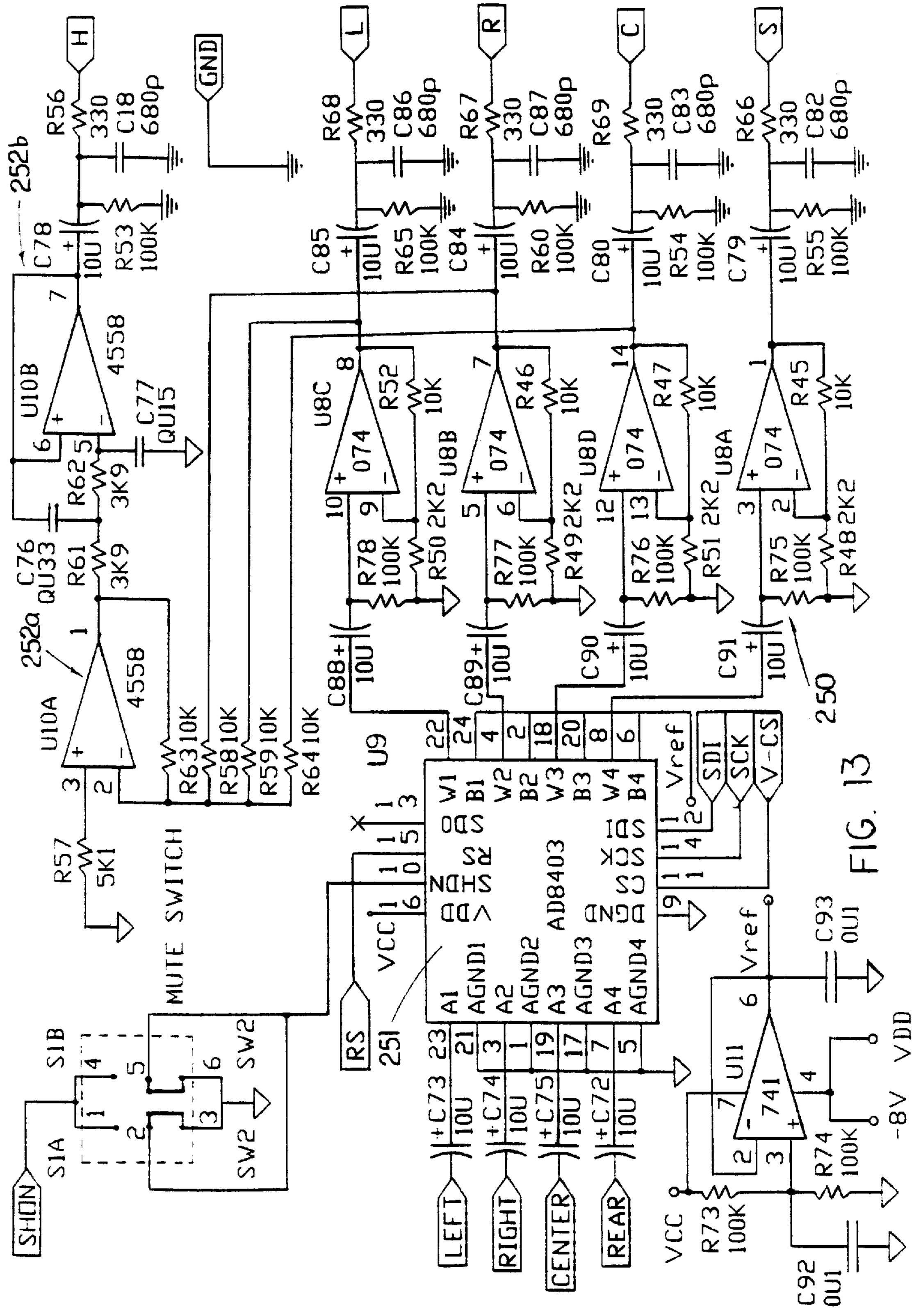
FIG. 13 is a circuit diagram showing the volume and output circuit of the PC surround decoder of the surround sound system according to the above preferred embodiment of the present
Figure 14:
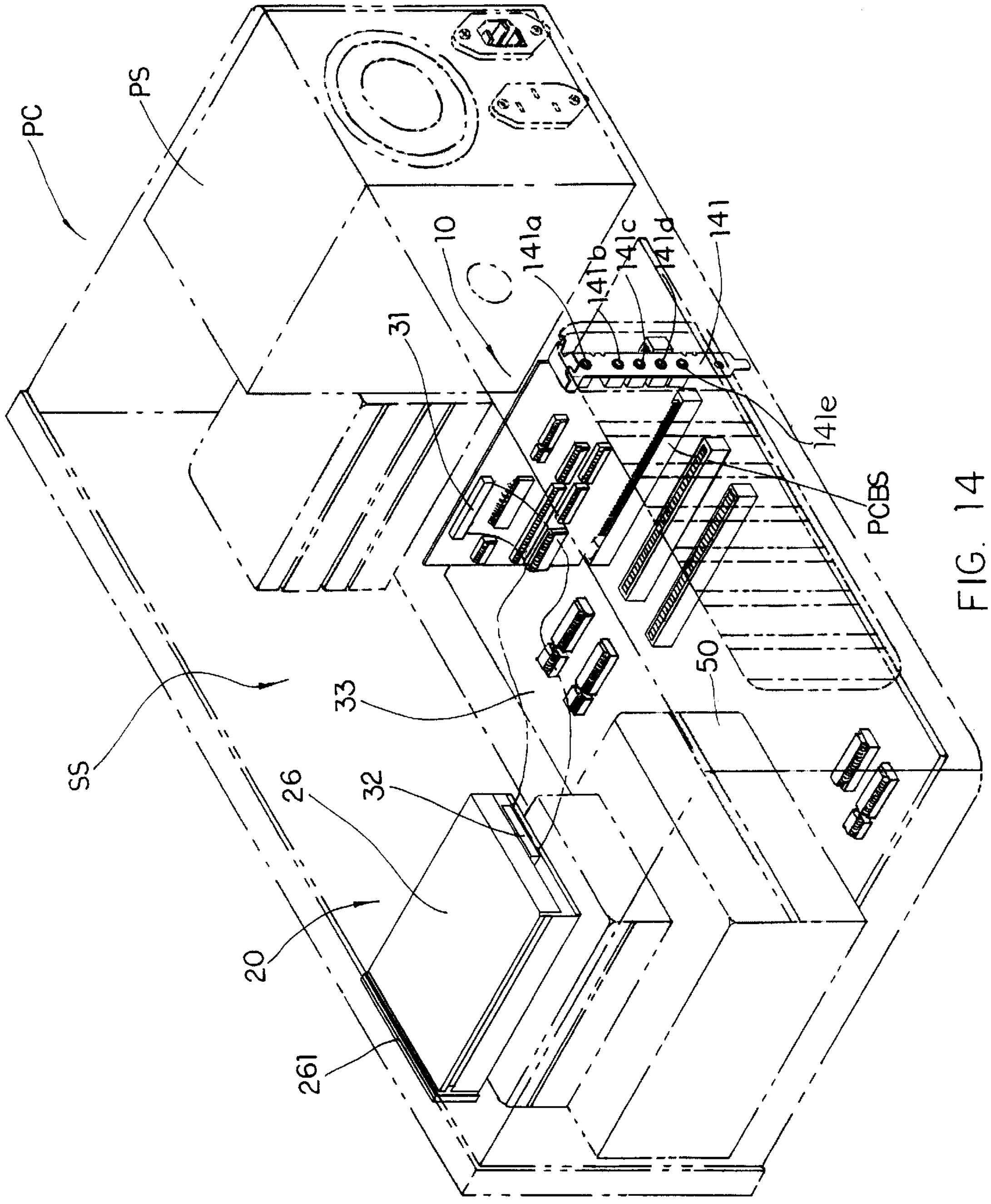
FIG. 14 is an exploded perspective view of the removable tray the PC surround decoder according to the above preferred embodiment of the present invention.

Referring to FIGS. 1 to 14, a surround sound system SS for a personal computer PC (as shown in FIG. 14) of the present invention comprises a control card 10 and a PC surround decoder 20. The control card 10 is a PC interface card for interfacing to the personal computer PC and draining the 5 V and ±12 V power from the personal computer PC as power source for both the control card 10 and the PC surround decoder 20 to operate. The PC surround decoder 20 processes the stereo source signal and generates left, center, right, surround and subwoofer signals. A connecting means 30 for electrically connecting the PC surround decoder to the control card.

Figure 2:
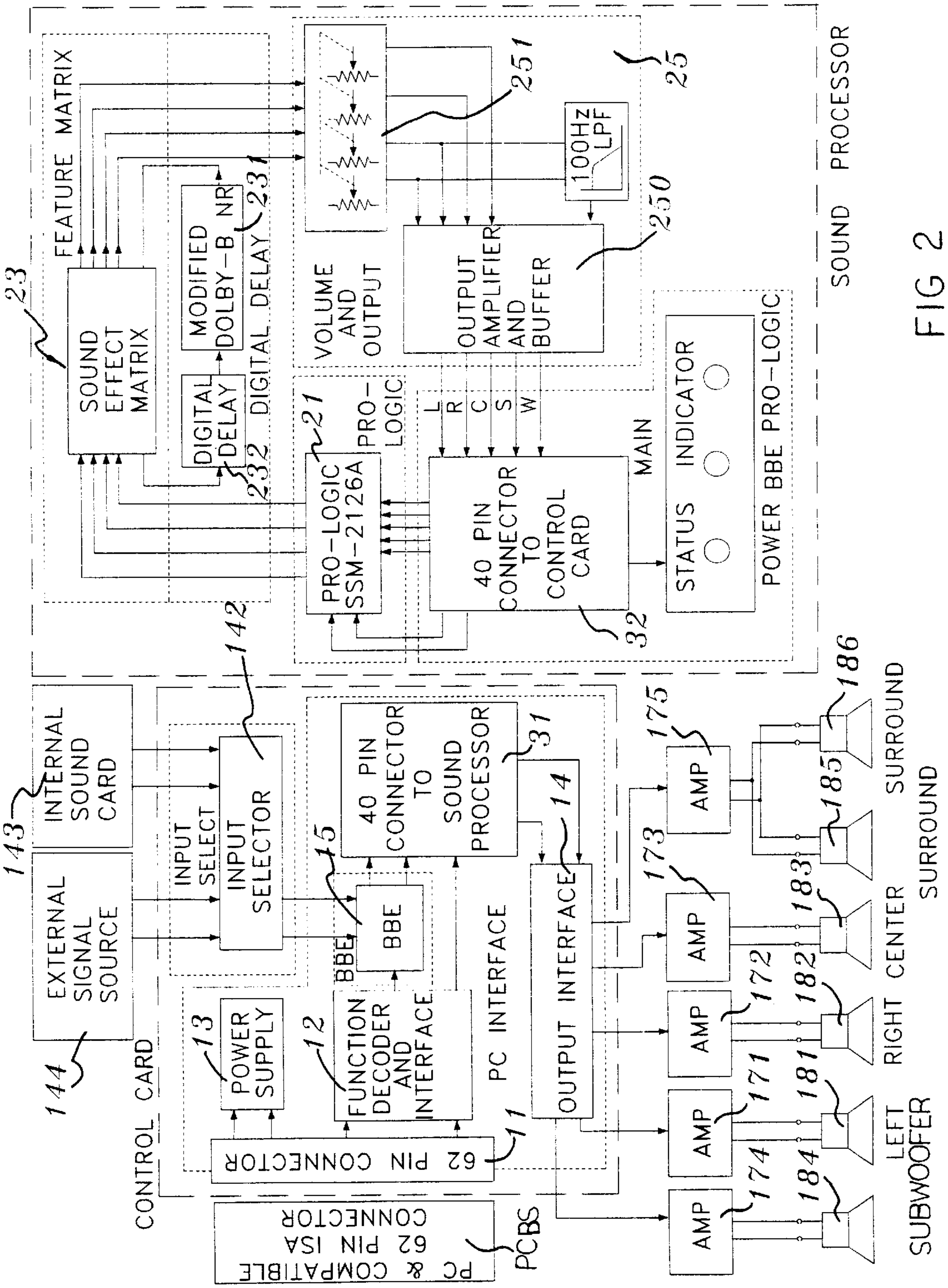
FIG. 2 is a block diagram of a surround sound system for personal computer according to the above embodiment of the present invention.
Figure 5:
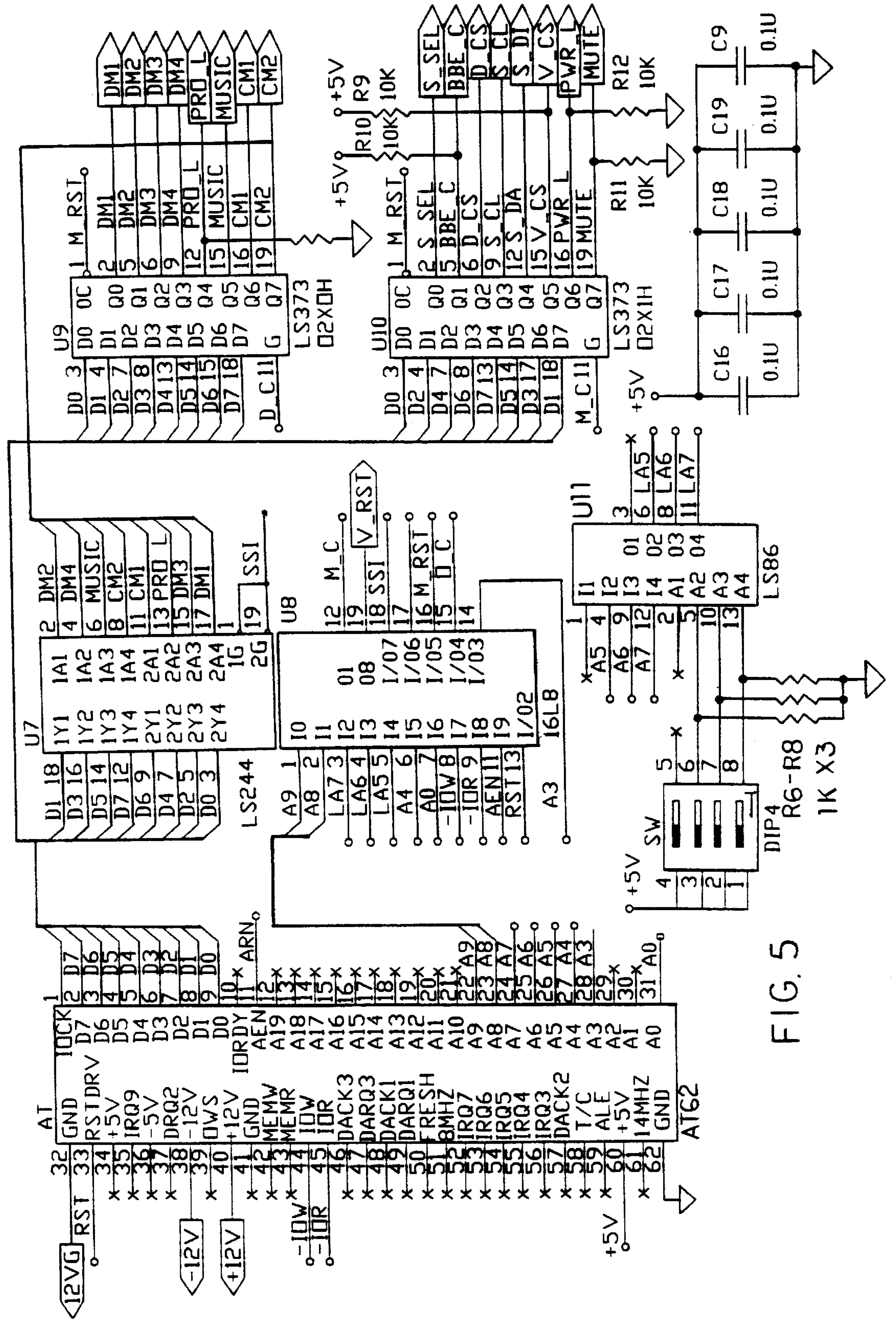
FIG. 5 is a partial circuit diagram showing portion of the control card circuitry of the surround sound system according to the above preferred embodiment of the present invention.

The control card 10, as shown in FIG. 2, has a 62 pin ISA bus connector 11 plugged to a and compatible 62 pin ISA bus slot PCBS inside the personal computer PC, a function decoder and interface means 12 and a power supply means 13. The function decoder and interface means 12, as shown in FIGS. 3 and 5, comprises a programmable logic array 121 for receiving the control signals and address signals from pins 11, 33, 44, 45 and pins 31, 22–27 respectively of the 62 pin ISA bus connector 11 of the personal computer PC motherboard (not shown in Figs.), a data buffer/driver 122 which is an integrate circuit, two 3-state D-type latches 123 and 124 receiving data signals from pins D0–D7 of the 62 pin ISA bus connector 11, and an address setting means 125 which comprises a quad 2-input exclusive or gate IC for serving as the address decoder.

The data buffer/driver 122 and the two 3-state D-type latches 123, 124 function as data and control interface circuit between the personal computer PC and the surround sound system SS in which the programmable logic array 121 also pre-programmed to serve as interface logic. Through the logic that pre-defined in the chip then distribute to the data buffer/driver 122 and the 3-state D-type latches 123, 124.

Figure 3:
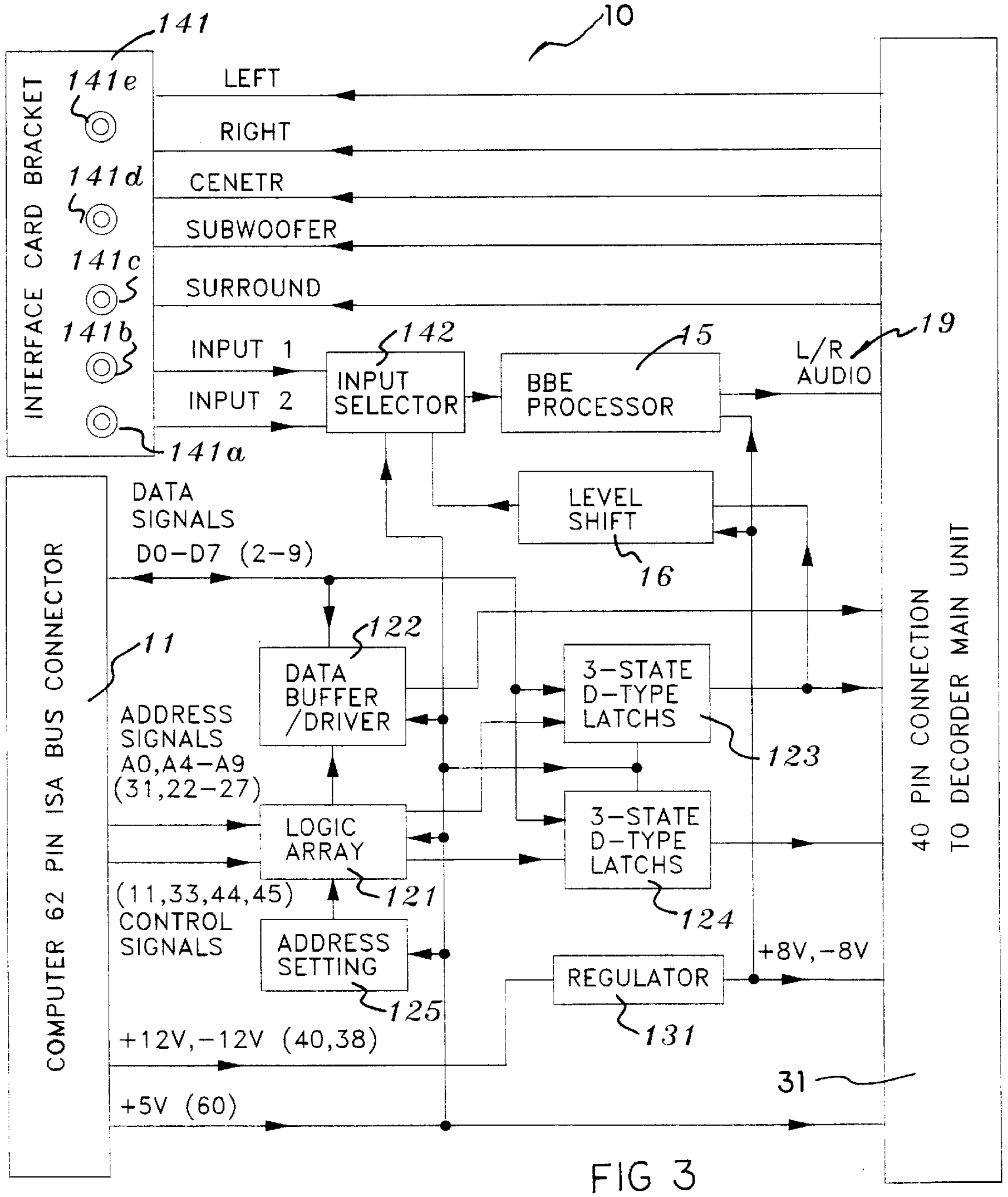
FIG. 3 is a block diagram of a control card of the surround sound system for personal computer according to the above preferred embodiment of the present invention.
Figure 6:
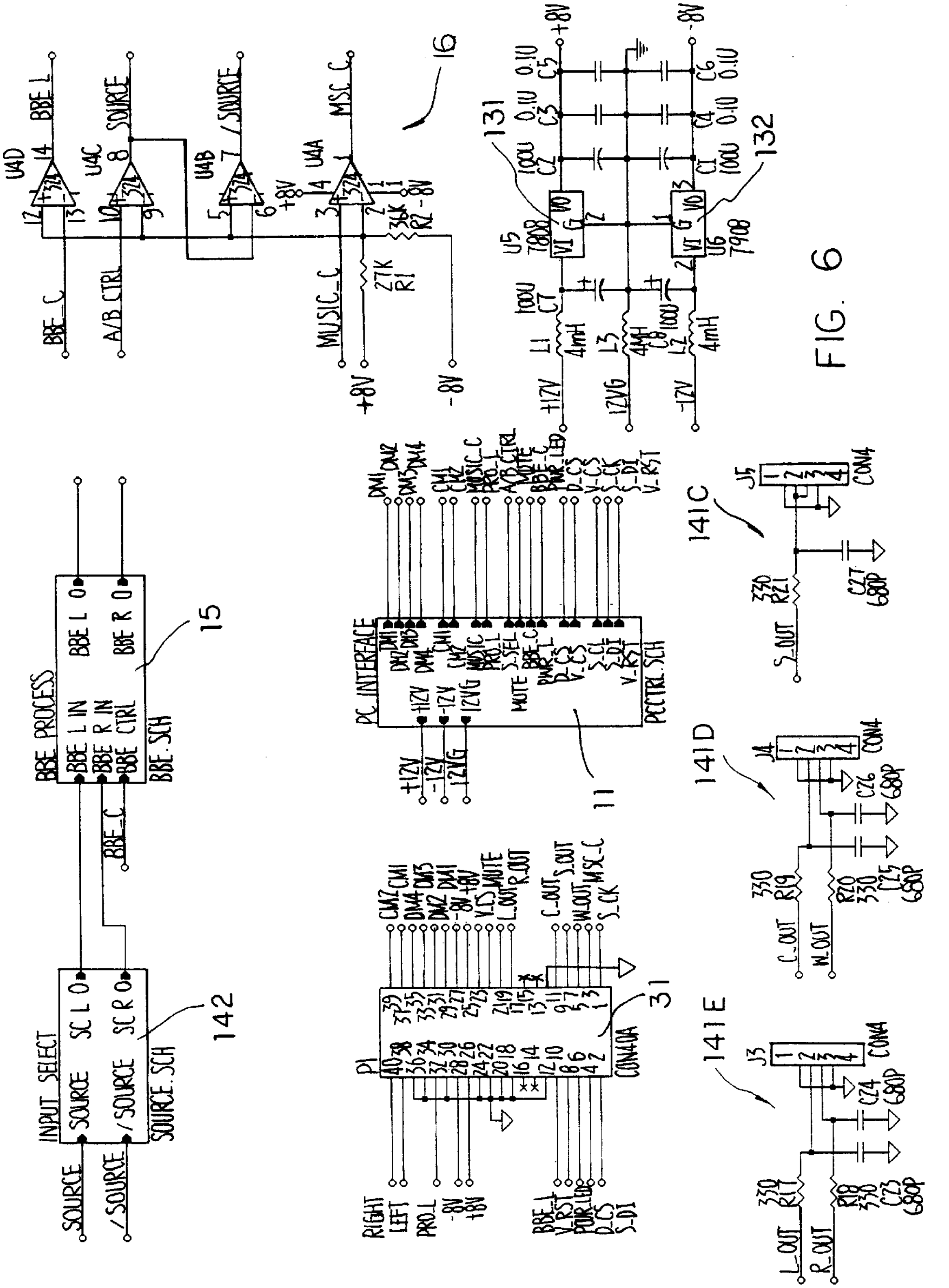
FIG. 6 is a partial circuit diagram showing some essential parts of the control card circuitry of the surround sound system according to the above preferred embodiment of the present invention.

The power supply means 13 comprises a predetermined number of IC regulator 131, 132, as shown in FIGS. 3 and 6, that regulate the ±12 VDC power source PS (as shown in FIG. 14) into ±8 VDC for linear circuitry on both the control card 10 and the PC surround decoder 20.

The control card 10, as shown in FIGS. 1, 2, 3 and 6, further comprises output interface 14 which comprises an interface card bracket 141 having five ports 141*a–e* and an input selector 142 for selecting the input signal. The input signal can be either feed from internal source pin-type connector of an internal sound card 143 connected to the first port 141*a* sitting on the interface card bracket 141 or from external source of 3 mm stereo jack 144 connected to the second port 141*b* on the bracket 141. Accordingly, as shown in FIG. 14, the output signal of a CD-ROM 50 can be connected to and received via the first port 141*a* and the output signal of a VCR can be connected to and received via the second port 141*b*.

Figure 7:
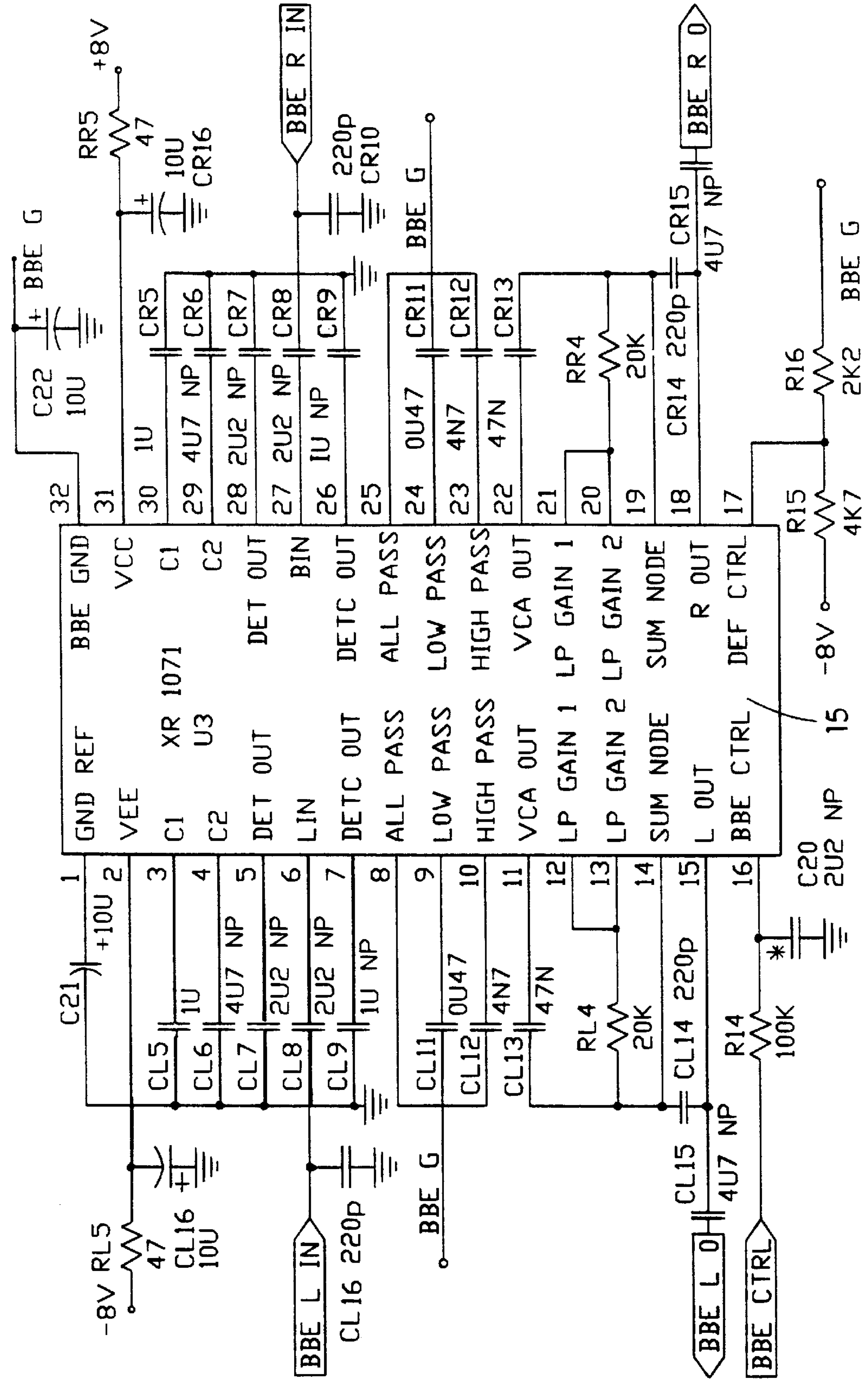
FIG. 7 is a circuit diagram showing the BBE processor of the control card circuitry of the surround sound system according to the above preferred embodiment of the present invention.
Figure 8:
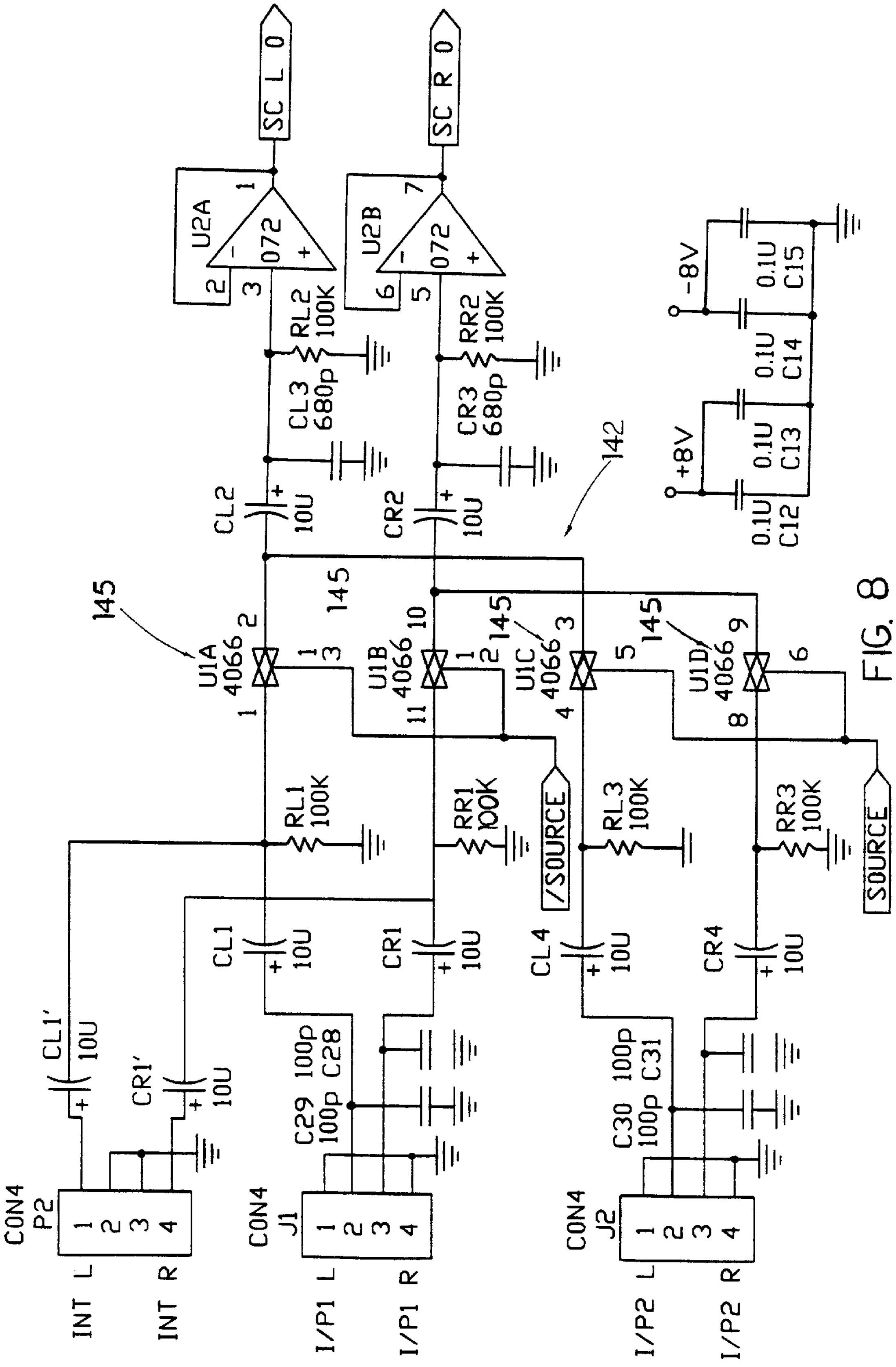
FIG. 8 is a circuit diagram showing the input selector circuit of the control card circuitry of the surround sound system according to the above preferred embodiment of the present invention.

The input selector 142, as shown in FIGS. 2, 3, 6 and 8, has a predetermined number of CMOS analog switches 145*a–d* function as gate to select the source signal. The signal then feed through a BBE high definition processor 15, as shown in FIGS. 2, 3 and 7, which has been designed to make music programs more intelligible and life-like than normally achieved with existing audio systems. The BBE processor 15 works dynamically by boosting the harmonic content of the music programs, as determined by the signal input, and imparting a linear phase shift across the audio spectrum. The phase shift allows for a separation of the high, medium and low frequencies so that they do not arrive speaker network at precisely the same time so as to prevent the higher frequencies from being smothered. As the phase shift is minimal, 2 milliseconds, it is not perceived as a delay or echo.

Figure 1A:
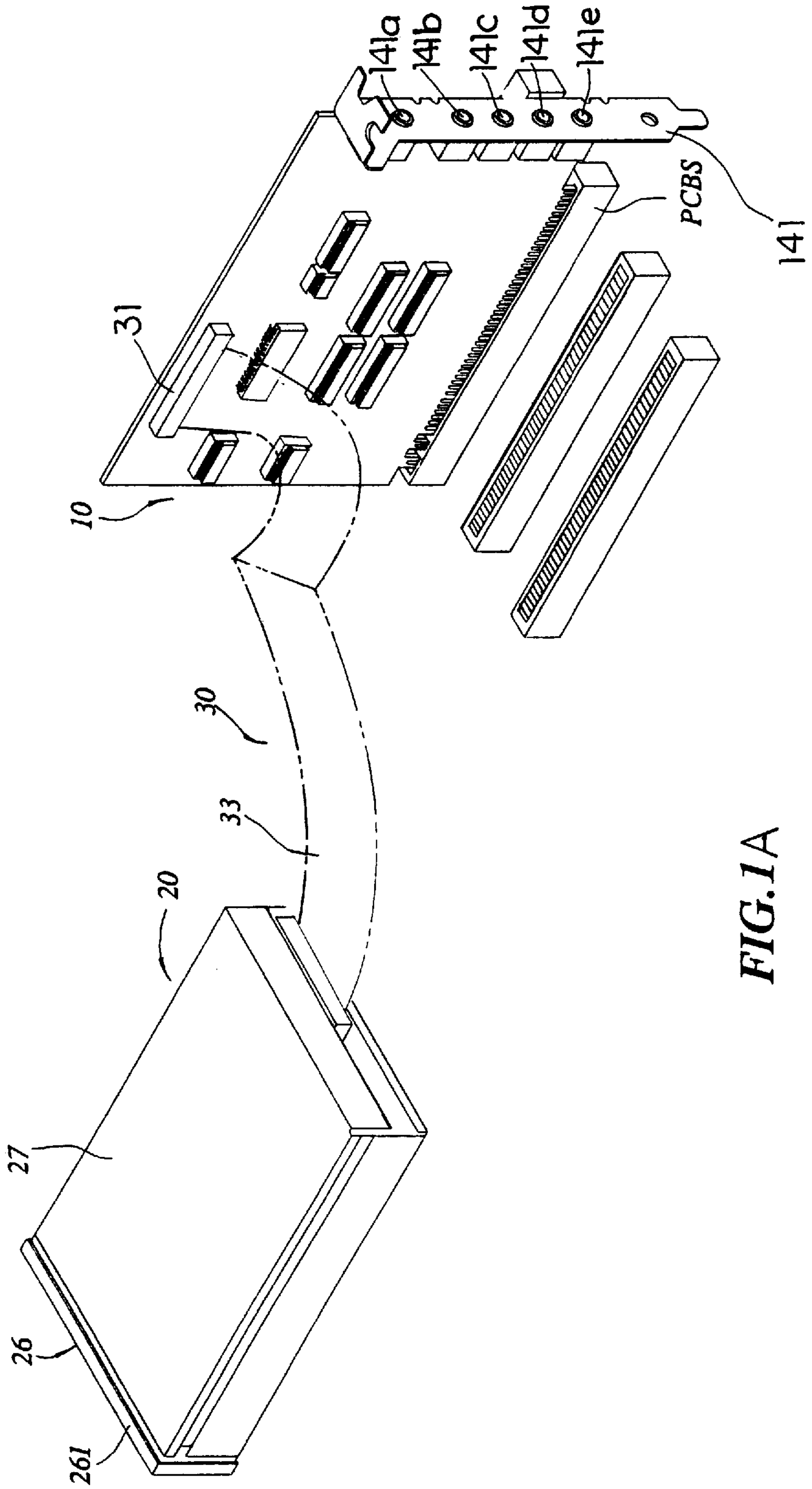
FIG. 1A is a perspective view of a surround sound system for personal computer according to a preferred embodiment of the present invention.

Since the logic circuit works on +5 V and the BBE processor 15 works on ±8 V, a level shift 16 functions as interface for the level different between two types of circuitry. As shown in FIGS. 1, 2 and 3, the third, fourth and fifth output ports 141*c*, 141*d* and 141*e* of the interface card bracket 141 are provided for connecting to the amplifiers 171–175 of the left, right, center, subwoofer, and surround speakers 181–186 respectively.

Figure 4:
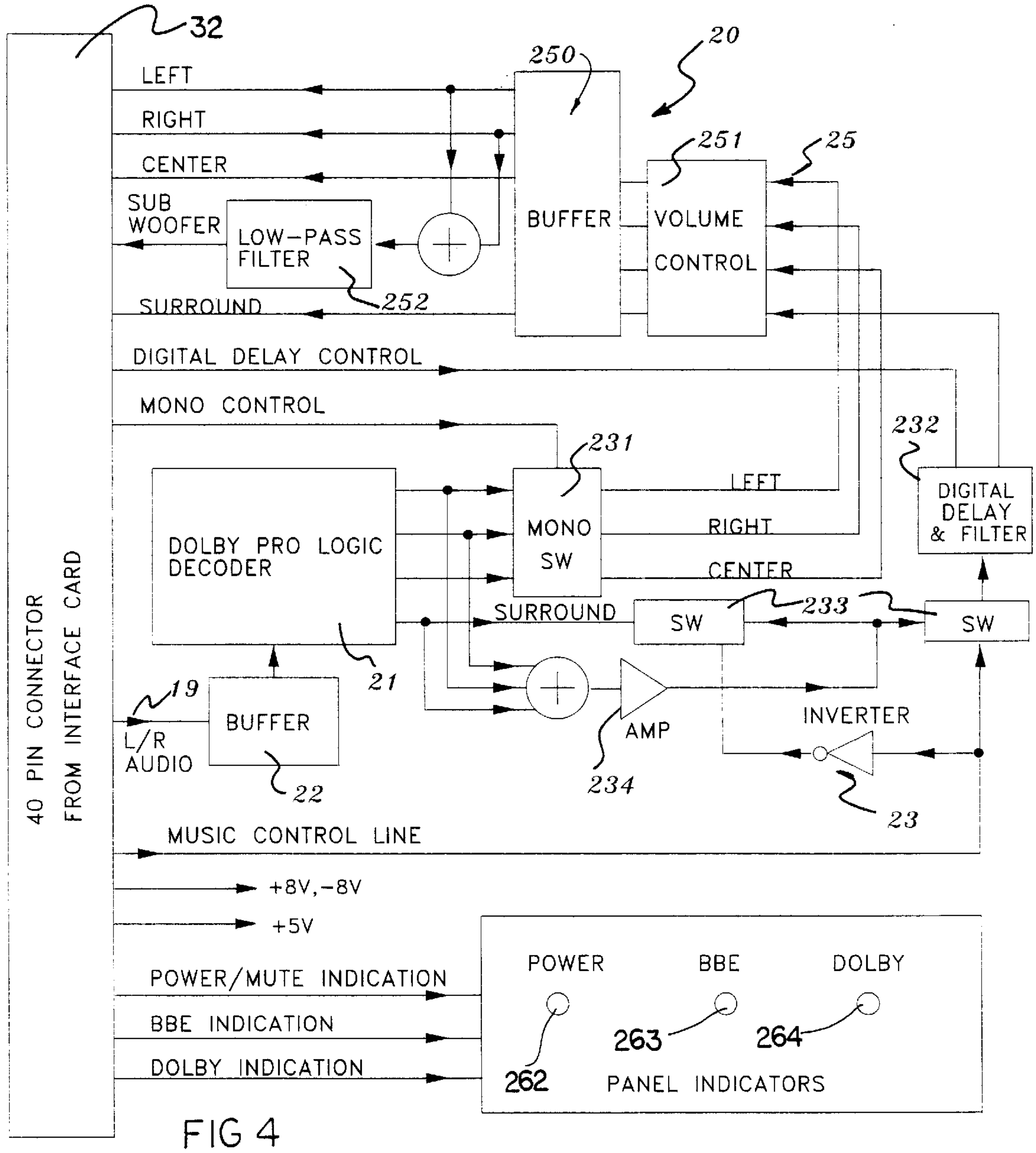
FIG. 4 is a block diagram of a PC surround decoder of the surround sound system for personal computer according to the above preferred embodiment of the present invention.

Referring to FIGS. 1, 2, 4 and 9, the PC surround decoder 20 comprises a Dolby Pro Logic decoder 21 and a built-in auto-balance buffer 22 which offers 100 dB dynamic range. The Dolby Pro Logic decoder 21 is an active process designed to enhance sound localization through the use of high-separation decoding techniques and is a direct descendant of the one used in Dolby stereo cinema processors, featuring a center channel output to complement the left, right and surround channels. The L/R audio signal 19, as shown in FIGS. 3 and 4, sending from the BBE processor 15 is fed through the buffer 22 and then send into the Dolby Pro Logic decoder 21.

Figure 9:
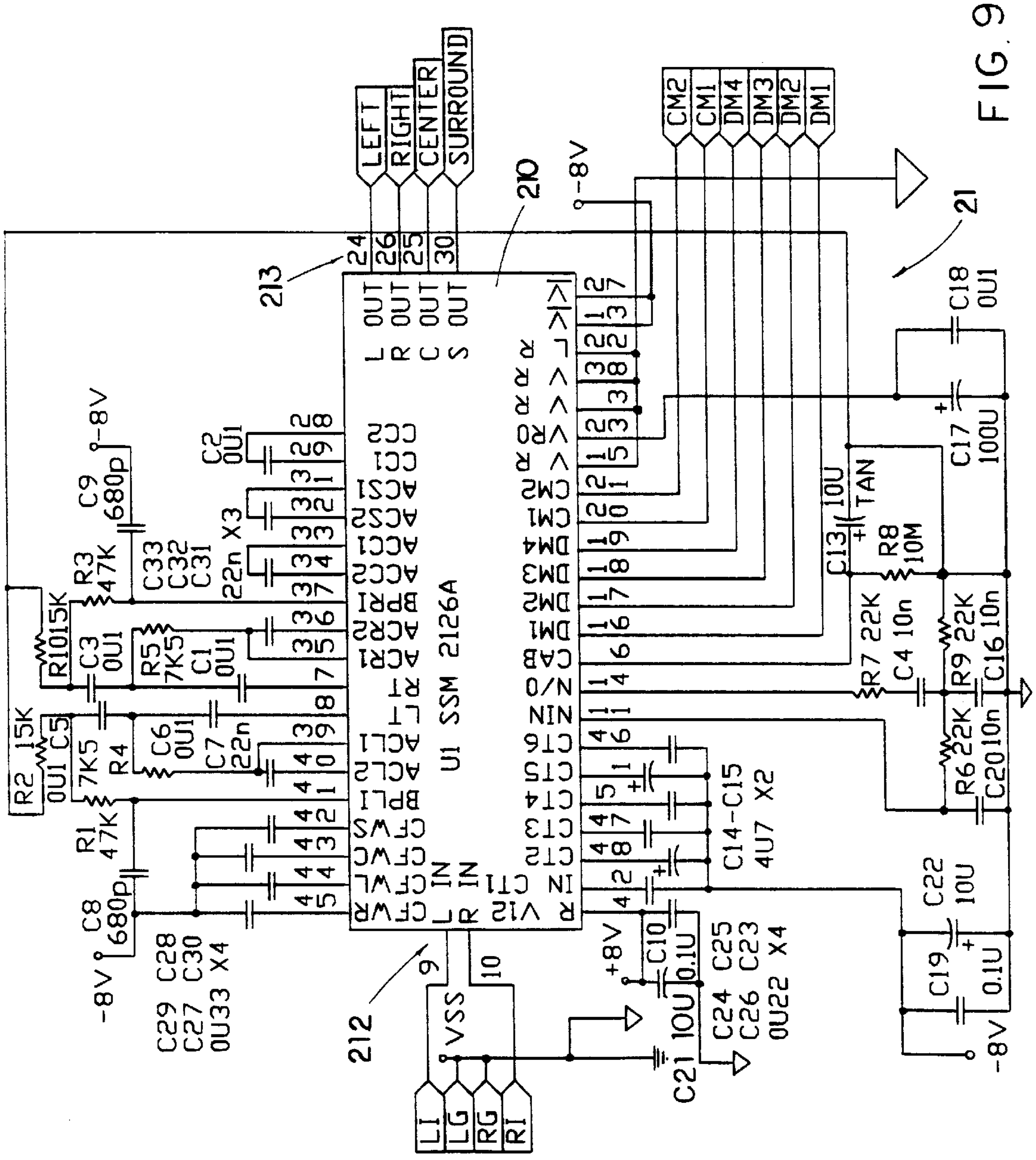
FIG. 9 is a circuit diagram showing the Pro Logic decoder circuit of the PC surround decoder of the surround sound system according to the above preferred embodiment of the present invention.
Figure 10:
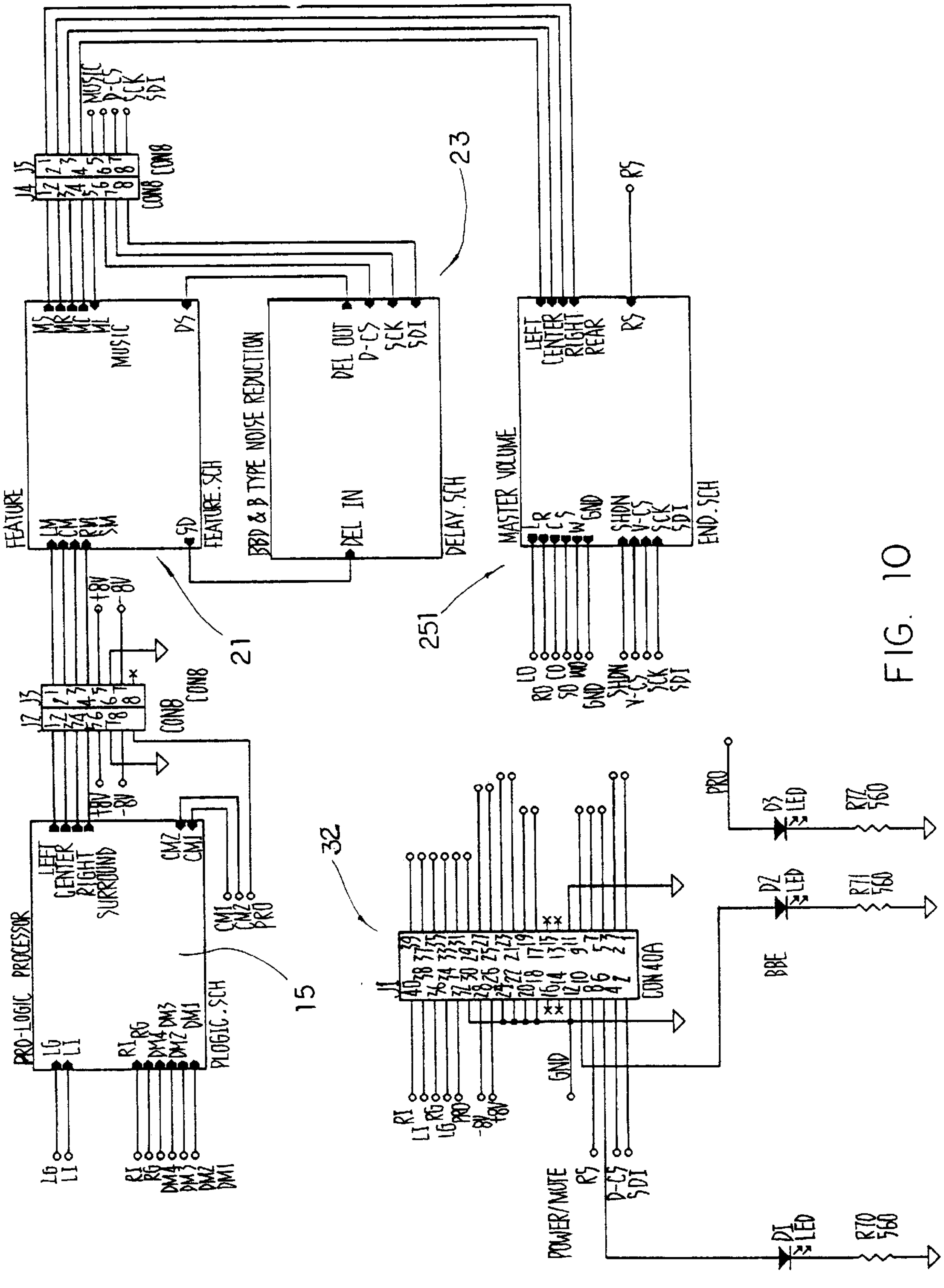
FIG. 10 is a partial circuit diagram showing some essential parts of the PC surround decoder of the surround sound system according to the above preferred embodiment of the present invention.
Figure 11:
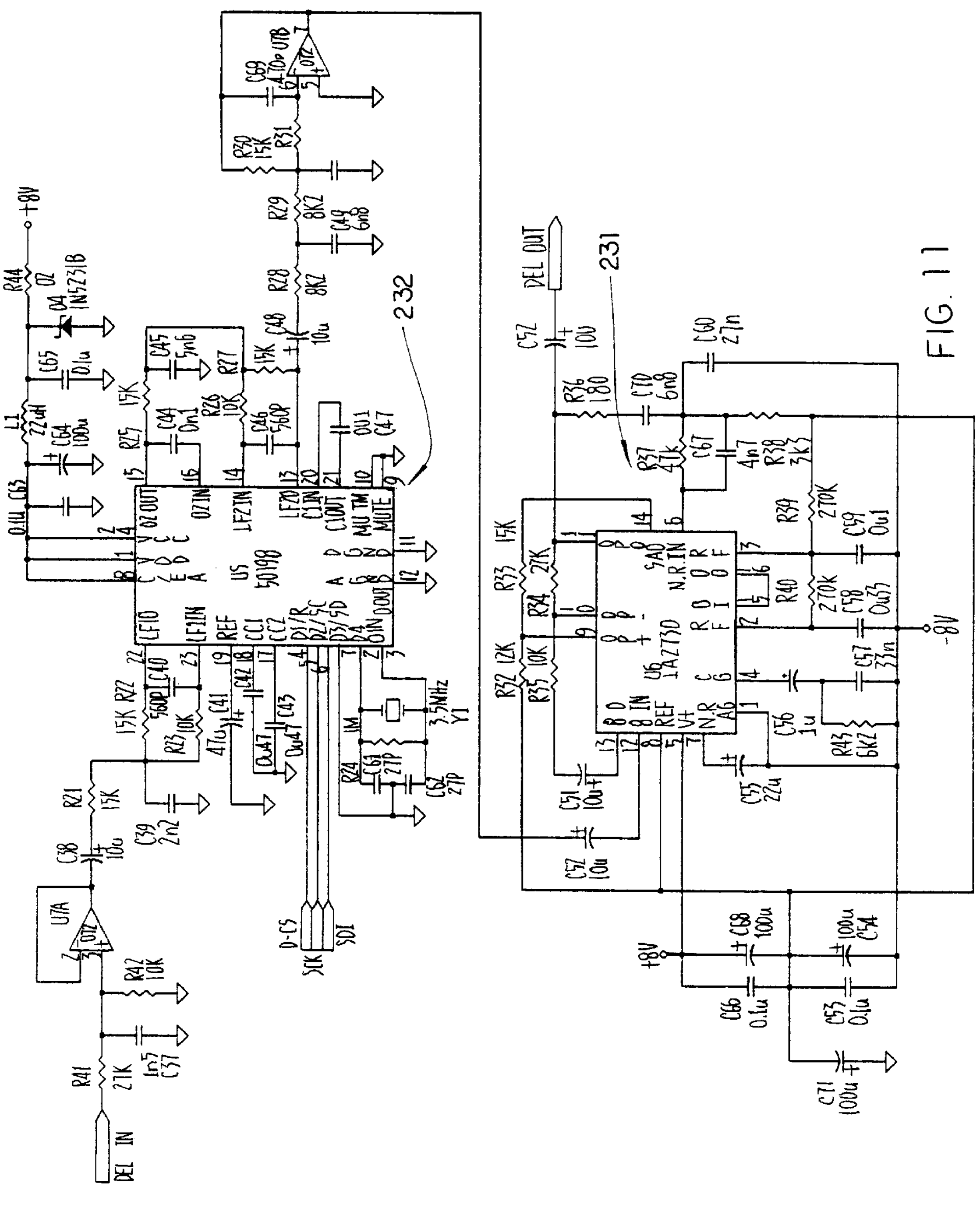
FIG. 11 is a circuit diagram showing the digital delay circuit of the PC surround decoder of the surround sound system according to the above preferred embodiment of the present invention.

The source L/R audio signal 19 having Dolby surround information is encoded by means of a Dolby notion picture matrix 211 of the Dolby Pro Logic decoder 21 that combines four information channels into the film's two tracks. The Pro Logic decoder 21 is a circuit that decodes surround information from two front channels 212 and produces center and surround channels 213. As shown in FIGS. 9 and 10, the Pro Logic decoder circuit 21 also includes a surround matrix comprising a delay line, a low-pass filter, a noise sequence generator, a modified B-type noise decoder, and a personal computer interface circuitry. There are also a software as device driver to be loaded into the personal computer PC.

The PC surround decoder 20, as shown in FIGS. 2, 4, 10 and 11, further comprises a digital delay circuitry 23 which has a monolithic circuit 231, a digital delay and filter circuit 232, a predetermined number of switch 233, and a predetermined number of amplifier 234. The monolithic circuit 231 does Dolby B-type noise reduction processing on the surround channel signal fed from the digital delay stage 232.

Figure 12:
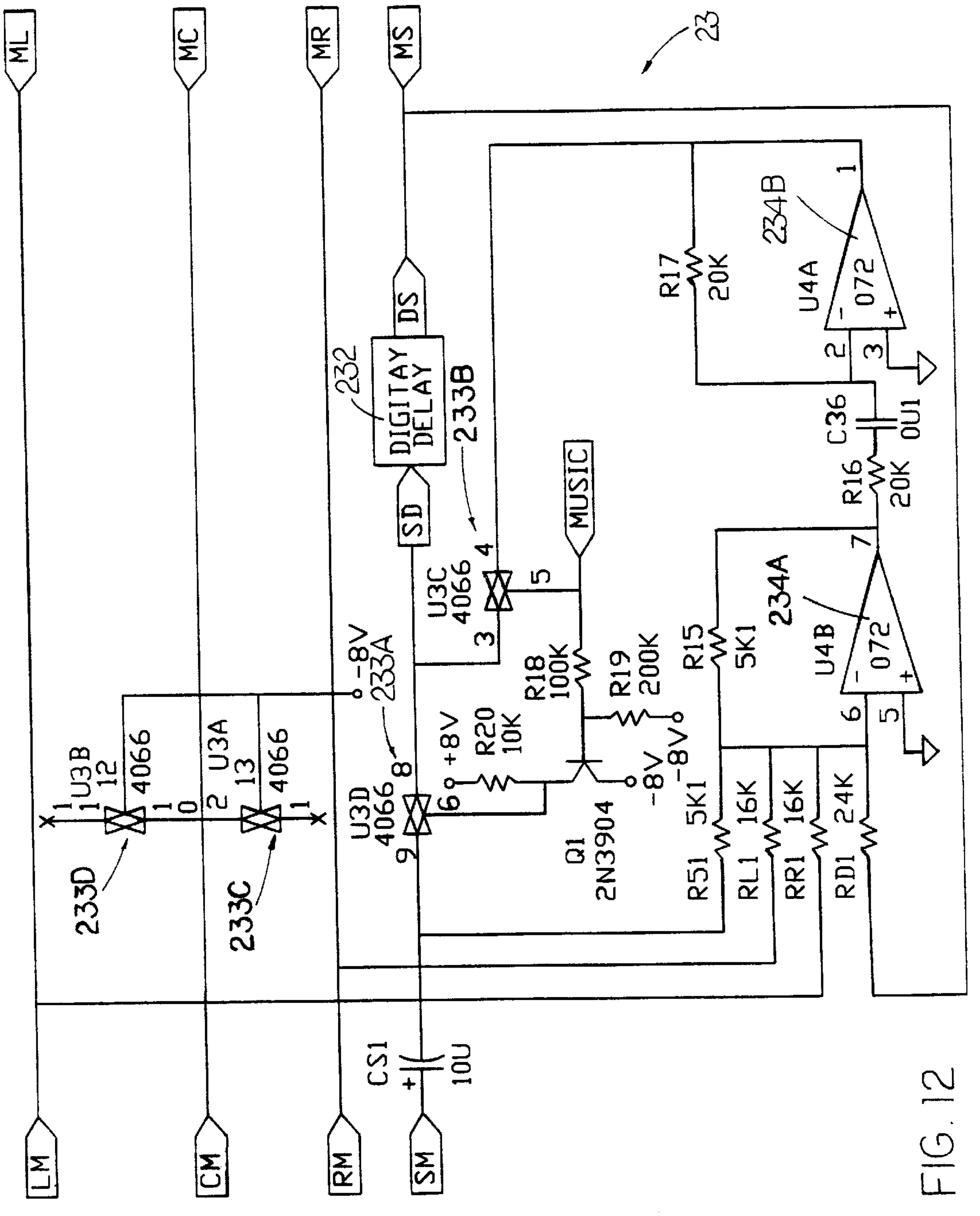
FIG. 12 is a circuit diagram showing the monolithic circuit of the PC surround decoder of the surround sound system according to the above preferred embodiment of the present invention.

As shown in FIG. 12, the switches 233*a–d* are integrate circuits for path control on the Pro Logic mode and music mode. At music mode, the operational amplifiers 234*a* and 234*b* work with the digital delay 232 and functions as Hall effect circuitry 24.

Referring to FIGS. 2, 4 and 13, the PC surround decoder 20 further comprises a volume and output means 25 which has an output amplifier and buffer means 250 and a volume control 251 outputting channel signals to the output amplifier and buffer means 250. The output amplifier and buffer means 250 has a low pass filter 252. The volume control 251 is an integrate circuit which is a 4-channel electronic potentiometers for controlling the signal levels of center, left, right, and rear channels. The volume control 251 functions as volume master control and individual channel level adjustments. The low pass filter 252 comprises two operational amplifiers 252*a* and 252*b* which summarize the left and right channel signal and output with subwoofer channel signal.

As shown in FIGS. 3 and 4, the built-in connecting means 30 includes a 40 pin interface connector 31 connected to the control card 10 and a 40 pin decoder connector 32 connected to the PC surround decoder 20. By connecting the interface connector 31 and the decoder connector 32, the circuitries of the control card 10 and the PC surround decoder 20 are electrically connected to form the surround sound system SS for personal computer PC. Thus, the control card 10 and the PC surround decoder 20 are able to incorporate on a circuit board for installing in the housing frame of the personal computer PC system, in which the interface card bracket 141 should be extended to the back panel of the housing frame for signals input and output.

In accordance with the present embodiment, in order to enable fast installation of the PC surround decoder 20 and make the PC surround decoder 20 becomes portable, as shown in FIGS. 1 and 14, the PC surround decoder 20 is installed within a removable tray 26 having size of 1 inch×4 inches×5.25 inches. The removable tray 26 is mounted into an empty drive bay in the front panel of the personal computer system PC for installation. The 40 pin decoder connector 32 is mounted on the rear side of the removable tray 26. Moreover, in order to enable easy input and output connection, the control card 10 is mounted on the rear panel of the personal computer system PC with the interface card bracket 141 exposed for signals input and output. The connecting means 30 further comprises a 40 pins flat cable 33 connected between the 40 pins interface connector 31 and the 40 pins decoder connector 32.

An alternative installing method is that the removable tray 26 can be slid into a fixed rack which is mounted into the drive bay in the front panel of the personal computer system PC as in the usual manner of installing the removable hard disk kit or CD-ROM. The 40 pin decoder connector 32 comprises a decoder connector bus slot mounted on the rear panel of the fixed rack and a decoder connector bus mounted on the rear side of the removable tray 26 so that when the removable tray 26 having the PC surround decoder 20 installed therein fully slides into the fixed rack, the decoder connector bus is fully plugged into the decoder connector bus slot.

Figure 1B:
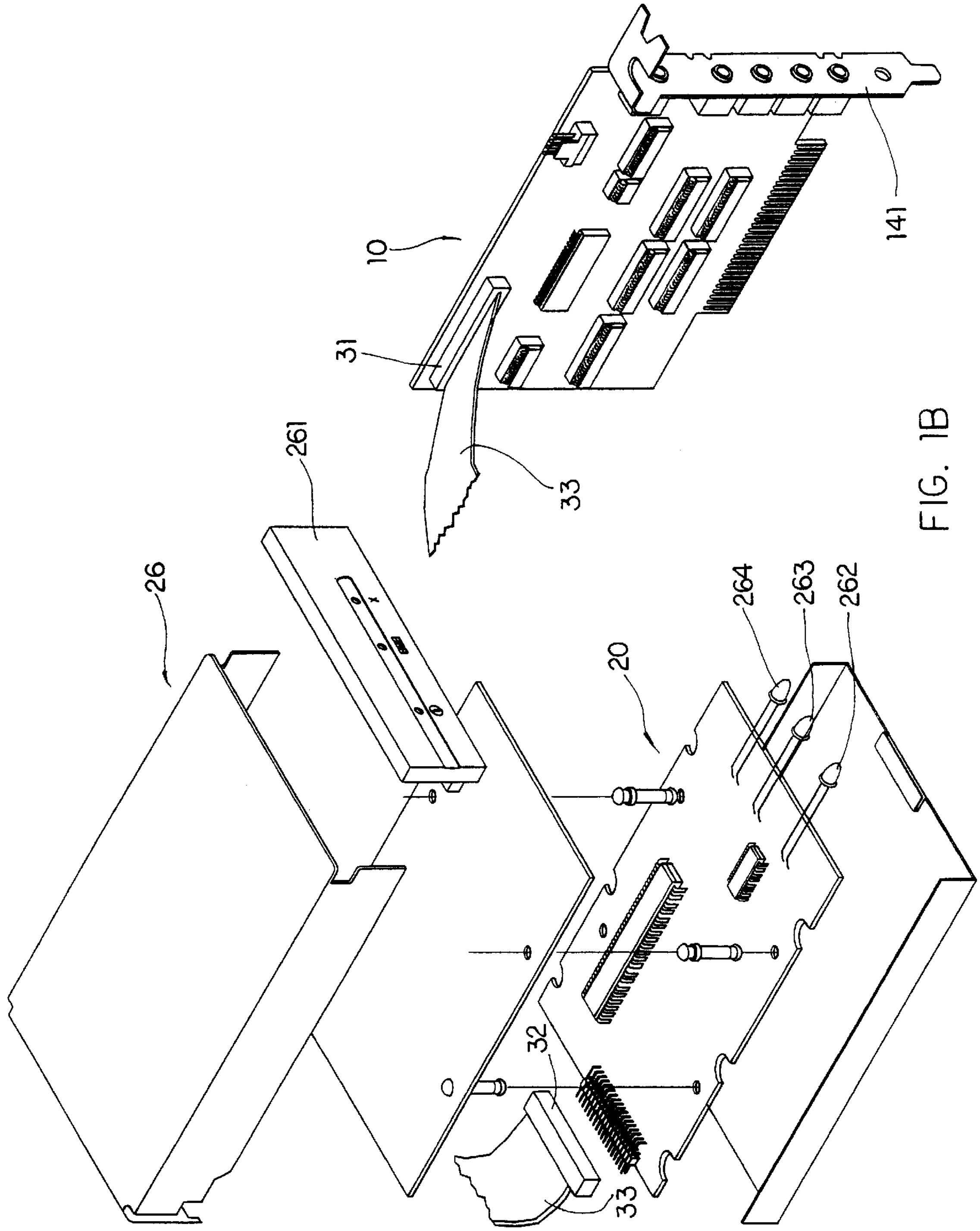
FIG. 1B is a perspective view of a surround sound system for personal computer with the PC surround decoder exploded according to a preferred embodiment of the present invention.

The front panel 261 of the removable tray 26 of the PC surround decoder 20, as shown in FIGS. 1B. has three lighting indicators 262, 263 and 264 showing the status of power, BBE function and Dolby function respectively that are controlled on the computer screen.

Incorporating with a specific software pre-installed in the personal computer system PC, a control panel, as shown in attachments appended in the present invention, can be observed on the monitor screen which includes all the functions and features of conventional audio/video appliance, such as printing of legends, push button switch, slide control potentiometer, display meter, etc.. The whole operation is designed to operate under the Microsoft Window environment so that it can also take the advantage of window environment of up and down button, grab and hold moving, pull down display switch, symbol and logo hide function that tie up with selected features.

According to the surround sound system SS for personal computer PC of the present invention as disclosed above, it is specified for incorporating with personal computer PC which overcomes all the technical and compatible difficulties and thus enables the users to command the PC surround sound system SS with their computer keyboard or mouse and receive the full benefit of Dolby Surround encoded multimedia software and the like. It equals a huge step forward in making the personal computer PC even more “user-friendly”. Various advantages are found as follows in accordance with the present invention.

The PC interface card bracket can carry selectable input connectors (3.5 mm, RCA type etc.) for audio input, or an input connector on the printed wire board that can hook up directly from CD-ROM player.

The PC interface card, i.e. the control card, can carry the output connector that sends out the decoded line level signals of left, right, center, surround, and subwoofer. It is so arranged that most of the personal computer PC speakers with 3.5 mm stereo connector are compatible with it.

It can save some logic circuit that a typical stand-alone Dolby Pro Logic decoder required to compliance with the Dolby standard, such noise sequencer controller, VCA volume control, all the logic functions that required some glue logic are all taken place.

By successfully incorporating the surround sound system SS with personal computer PC according to the present invention, all the setting on the control panel can be save in the computer.

The surround sound system SS of the present invention is embedded in the multimedia computer and is designed to drain the computer existing power of +5 V, ±12 V power source so as to eliminate the power supply device of the system which is an essential device included in the conventional home audio surround sound system.

Beside the socking of power from motherboard of the personal computer PC, the voltage regulation circuitry is created too for serving both the voltage conversion and noise immunity purpose. Moreover, to utilize the operation power of the personal computer PC, there are some logic circuit created to interface between the personal computer PC and the PC surround decoder and thus makes the Dolby surround decoder as part of the personal computer PC system and merges both in hardware and software ways.

The basic hardware and software structures make it a frameware that is very flexible in the products diversified. By simply some minor change in one or both aspect, the product will be easily be modified to different features and function so that embodiment disclosed above cannot be treated as the merely claiming structure of the present invention. Various alternatives and modifications are easily made by person in art according to the concept introduced by the above disclosed embodiment.

What is claimed is:

1. A surround sound system for personal computer for interfacing surround sound with personal computer, comprising a control card, a PC surround decoder for processing a stereo source signal and generating left, center, right, surround and subwoofer signals; and a connecting means for electrically connecting said PC surround decoder to said control card; wherein said control card is a PC interface card for interfacing to a personal computer and draining a 5 VDC and ±12 VDC power from said personal computer as a power source for both said control card and said PC surround decoder to operate and provide a noise immunity purpose, said control card having an ISA bus connector plugged to a compatible ISA bus slot insides said personal computer, a function decoder and interface means and a power supply means, wherein said function decoder and interface means comprises a programmable logic array for receiving control signals and address signals from said ISA bus connector of said personal computer, said power supply means comprising a predetermined number of regulator to regulate said power source from ±12 VDC into ±8 VDC for both said control card and said PC surround decoder, said control card further comprising a data buffer/driver, a predetermined number of 3-state D-type latches for receiving data signals from said ISA bus connector, an input selector for selecting said source signal, and an address setting means which comprises a quad 2-input exclusive or gate IC for serving as an address decoder, said data buffer/driver and said 3-state D-type latches functioning as a data and control interface circuit between said personal computer and said surround sound system; and said control card further comprising a high definition BBE Processor, said input selector comprising a predetermined number of CMOS analog switches functioning as gate to select said source signal, said source signal being fed through said BBE processor, said BBE processor working dynamically by boosting a harmonic content of music programs, as determined by said source signal input, and imparting a linear phase shift across an audio spectrum, thereby said linear phase shift allows for a separation of high, medium and low frequencies so that said frequencies do not arrive to a speaker network at precisely the same time so as to prevent said higher frequencies from being smothered, moreover, as said linear phase shift is minimal, 2 milliseconds, that is not perceived as a delay, said PC surround decoder comprising a Dolby Pro Logic decoder which is an active process designed to enhance sound localization through using of high-separation decoding techniques and is a direct descendant as using in Dolby stereo cinema processors, featuring a center channel output to complement a left, a right and a surround channel.

2. A surround sound system, as recited in claim 1, wherein said PC surround decoder further comprises a buffer, wherein a L/R audio signal sending from said BBE processor is fed through said buffer and then sent into said Dolby Pro Logic decoder, said L/R audio signal having a Dolby surround information and being encoded by means of a Dolby notion picture matrix of said Dolby Pro Logic decoder which combines four information channels into two tracks of a film.

3. A surround sound system, as recited in claim 2, wherein said Dolby Pro Logic decoder comprises a circuit decoding said Dolby surround information from two front channels and producing center and surround channels.

4. A surround sound system, as recited in claim 2, wherein said circuit of said Dolby Pro Logic decoder further includes a surround matrix which comprises a delay line, a low-pass filter, a noise sequence generator, a modified B-type noise decoder, and a personal computer interface circuitry, and that a software as a device driver is loaded into said personal computer.

5. A surround sound system, as recited in claim 3, wherein said Dolby Pro Logic decoder further comprises a built-in auto-balance buffer which offers a 100 dB dynamic range.

6. A surround sound system, as recited in claim 5, wherein said PC surround decoder further comprises a digital delay circuitry which comprises a monolithic circuit, a predetermined number of switches, an amplifier, and a digital delay and filter, wherein said monolithic circuit does Dolby B-type noise reduction processing on a surround channel signal fed from a digital delay stage and said switches are integrate circuits for path control on a Pro Logic mode and a music mode, so that at said music mode, said amplifier works with said digital delay and functions as a Hall effect circuitry.

7. A surround sound system, as recited in claim 6, wherein said PC surround decoder further comprises a volume and output means having a volume control and a low pass filter, said volume control comprising an integrate circuit which is a 4-channel electronic potentiometer for controlling signal levels of said four information channels, including center, left, right, and rear channels, said volume control functioning as volume master control and individual channel level adjustment, and said low pass filter comprising two operational amplifiers which summarize a left and a right channel signal and output with a subwoofer channel signal.

8. A surround sound system, as recited in claim 1, wherein said connecting means includes an interface connector connected to said control card and a decoder connector connected to said PC surround decoder for electrically connecting with said interface connector.

9. A surround sound system, as recited in claim 8, wherein said connecting means further comprises a flat cable connected from said interface connector of said control card to said decoder connector of said PC surround decoder.

10. A surround sound system, as recited in claim 7, wherein said connecting means includes a 40 pin interface connector connected to said control card, a 40 pin decoder connector connected to said PC surround decoder, and a 40 pins flat cable connected from said 40 pin interface connector to said 40 pin decoder connector.

11. A surround Sound system, as recited in claim 9, wherein said control card is mounted on a rear panel of said personal computer and said PC surround decoder is installed within a removable tray, said removable tray being mounted into an empty drive bay in a front panel of said personal computer for installation.

12. A surround sound system, as recited in claim 10, wherein said control card is mounted on a rear panel of said personal computer and said PC surround decoder is installed within a removable tray, said removable tray being mounted into an empty drive bay in a front panel of said personal computer system for installation.

13. A surround sound system, as recited in claim 9, wherein said front panel of said removable tray of said PC surround decoder has three indicators showing the status of power, BBE function and Dolby function respectively that are controlled on the computer screen.

14. A surround sound system, as recited in claim 1, wherein said control card further comprises an interface card bracket and said source signal is fed from an internal source pin-type connector which is sit on said interface card bracket.

15. A surround sound system, as recited in claim 1, wherein said control card further comprises an interface card bracket and said source signal is fed from an external source of a 3 mm stereo jack on said interface card bracket.

16. A surround sound system, as recited in claim 9, wherein said control card further comprises an interface card bracket and said source signal is fed from an internal source pin-type connector which is sit on said interface card bracket.

17. A surround sound system, as recited in claim 16, wherein said control card further comprises an interface card bracket and said source signal is fed from an external source of a 3 mm stereo jack on said interface card bracket.

18. A surround sound system, as recited in claim 12, wherein said control card further comprises an interface card bracket and said source signal is fed from an internal source pin-type connector which is sit on said interface card bracket.

19. A surround sound system, as recited in claim 18, wherein said control card further comprises an interface card bracket and said source signal is fed from an external source of a 3 mm stereo jack on said interface card bracket.

* * * * *